United States Patent
Kim et al.

(10) Patent No.: US 12,159,295 B2
(45) Date of Patent: Dec. 3, 2024

(54) DISCOUNT SERVICE DEVICE AND METHOD

(71) Applicant: PTION CO., LTD., Seoul (KR)

(72) Inventors: Dong Ju Kim, Seoul (KR); Woo-Hyun Kim, Seoul (KR); Namhyun Kim, Gyeonggi-do (KR); Doheon Kim, Gyeonggi-do (KR)

(73) Assignee: PTION CO., LTD., Seoul (KR)

( * ) Notice: Subject to any disclaimer, the term of this patent is extended or adjusted under 35 U.S.C. 154(b) by 0 days.

(21) Appl. No.: 18/467,317

(22) Filed: Sep. 14, 2023

(65) Prior Publication Data

US 2024/0005353 A1      Jan. 4, 2024

Related U.S. Application Data

(63) Continuation-in-part of application No. 17/945,409, filed on Sep. 15, 2022, now abandoned, which is a
(Continued)

(30) Foreign Application Priority Data

Jun. 10, 2020   (KR) ........................ 10-2020-0070423

(51) Int. Cl.
*G06Q 30/00*    (2023.01)
*G06N 3/08*     (2023.01)
(Continued)

(52) U.S. Cl.
CPC ........... *G06Q 30/0235* (2013.01); *G06N 3/08* (2013.01); *G06Q 30/0206* (2013.01)

(58) Field of Classification Search
None
See application file for complete search history.

(56) References Cited

U.S. PATENT DOCUMENTS 9,934,533 B1    4/2018  Griffith
2008/0162211 A1 7/2008  Addington
(Continued)

FOREIGN PATENT DOCUMENTS

CN              101198980 A     6/2008
KR    10-2004-0013676 A         2/2004
(Continued)

OTHER PUBLICATIONS

Yang, Jinchao. "Promotion Pricing Strategy of Discount and Full-Reduction." World Scientific Research Journal 7.4 (2021): 74-79. (Year: 2021).*
(Continued)

*Primary Examiner* — Michael Bekerman
(74) *Attorney, Agent, or Firm* — Bridgeway IP Law Group, PLLC; Jihun Kim

(57) ABSTRACT

A discount service method carried out by a discount service device. The method includes: obtaining discount rate information based on changes in variable values of respective discount elements of an object being sold; on the basis of the discount rate information, identifying, for a plurality of sales records of the object being sold, a consumer distribution corresponding to changes in the discount rates of the respective discount elements of the object being sold; and determining a final discount rate for a predetermined consumer of the object being sold, by applying weights to the respective discount elements, calculated on the basis of the identified consumer distribution. When the consumer distribution changes, the weights of the respective discount elements change, and thus the final discount rate is determined differently, even when the variable values of the respective discount elements for the predetermined consumer are the same.

15 Claims, 5 Drawing Sheets

Related U.S. Application Data continuation of application No. PCT/KR2021/006825, filed on Jun. 1, 2021.

(51) Int. Cl.
*G06Q 30/0201* (2023.01)
*G06Q 30/0235* (2023.01)

(56) References Cited

U.S. PATENT DOCUMENTS

| | | | |
|---|---|---|---|
| 2013/0304524 | A1 | 11/2013 | Cizaire |
| 2018/0018683 | A1 | 1/2018 | Yee et al. |
| 2021/0241330 | A1* | 8/2021 | Vaishnav ........... G06Q 30/0206 |

FOREIGN PATENT DOCUMENTS

| KR | 10-2006-0118294 A | 11/2006 |
|---|---|---|
| KR | 10-2009-0015383 A | 2/2009 |
| KR | 10-2013-0018430 A | 2/2013 |
| KR | 10-2013-0020385 A | 2/2013 |
| KR | 10-2014-0111153 A | 9/2014 |
| KR | 10-1892579 B1 | 8/2018 |
| KR | 10-2220953 B1 | 3/2021 |
| WO | 2018017323 A1 | 1/2018 |

OTHER PUBLICATIONS

Won, Dong C., and Young H. Lee. "Optimal dynamic pricing for sports games with habitual attendance." Managerial and Decision Economics 29.8 (2008): 639-655. (Year: 2008).*
International Search Report issued on Sep. 6, 2021 in corresponding application No. PCT/KR2021/006825; 7 pgs.
Written Opinion of the International Searching Authority issued on Sep. 6, 2021 in corresponding application No. PCT/KR2021/006825; 5 pgs.

* cited by examiner

DISCOUNT SERVICE DEVICE AND METHOD

CROSS-REFERENCE TO RELATED APPLICATIONS

This application is a continuation-in-part application of the U.S. Utility patent application Ser. No. 17/945,409 filed on Sep. 15, 2022, which was a continuation application of International Application No. PCT/KR 2021/006825 which was filed on Jun. 1, 2021 claiming priority from Korean Patent Application No. 10-2020-0070423, filed on Jun. 10, 2022, entitled "DISCOUNT SERVICE DEVICE AND METHOD," the entire contents of which are hereby incorporated by reference.

TECHNICAL FIELD

The present disclosure relates to a discount service device and method, and more particularly, to a discount service device and method for providing a discount service for an object to be sold depending on a change in a commerce environment.

BACKGROUND

As is well known, among objects for commercial transaction, there are objects of which values change depending on changes in an environment such as time. For example, it can be seen that values of movie tickets, performance tickets, or the like decrease to 0 won when a showtime, that is, a screening time or a performance time, has elapsed and thus, as the remaining time until the showtime becomes shorter, the value of the ticket decreases. In addition, as for movie tickets or concert tickets, the lower the popularity of the content, the greater the likelihood that the showtime would pass in a state that the tickets remain unsold, and consumers farther away from the show place are less likely to purchase the relevant ticket.

According to the related art, it has been sought to sell tickets at a discount when the showtime therefor is imminent, or to provide discount coupons to consumers near the service place. However, since only the discount is decided in consideration of the remaining time until the showtime, in particular, satisfaction in a seller's point of view is low, and thus, such a measure is not widely applied to actual commerce.

Prior Art Document (Patent Document 1) Korean Patent Application Laid-Open No. 10-2004-0013676 (published on Feb. 14, 2004)

(Patent Document 2) Korean Patent Application Laid-Open No. 10-2009-0015383 (published on Feb. 12, 2009)

SUMMARY

According to one exemplary embodiment of the present disclosure, it is possible to provide a discount service device and method capable of maximally guaranteeing a marketing effect by a discount and generating a minimum discount cost by determining a discount rate in consideration of a change in a discount factor due to a change in a commerce environment.

The object to be achieved by the present disclosure is not limited to those mentioned above, and other objects which are not mentioned would be clearly understood by those of ordinary skill in the art to which the present disclosure belongs from the following description.

In accordance with a first aspect, there is provided a discount service method performed by a discount service device, the method comprising: obtaining discount rate information depending on a change in a variable value for each of discount factors for an object to be sold; identifying, for a plurality of sales records for the object to be sold, a consumer distribution corresponding to a change in a discount rate for each discount factor for the object to be sold according to the discount rate information; and determining a final discount rate for a predetermined consumer of the object to be sold by applying a weight for each discount factor calculated based on the identified consumer distribution, wherein when the consumer distribution is changed, the weight for each discount factor is changed, and the final discount rate is determined differently even when the variable value for each discount factor of the predetermined consumer is kept the same.

In accordance with a second aspect, there is provided a discount service device comprising: an input unit configured to receive a plurality of sales records for an object to be sold; and a processor unit configured to determine a final discount rate for the object to be sold based on the plurality of sales records received through the input unit, wherein the processor unit obtains discount rate information depending on a change in a variable value for each of discount factors for the object to be sold, identifies, for the plurality of sales records for the object to be sold, a consumer distribution corresponding to the change in the discount rate for each discount factor for the object to be sold according to the discount rate information, determines a final discount rate for a predetermined consumer of the object to be sold by applying a weight for each discount factor calculated based on the identified consumer distribution, and determines the final discount rate differently even in a case that the variable value for each discount factor of the predetermined consumer is kept the same, when the consumer distribution is changed and the weight for each discount factor is changed.

In accordance with a third aspect, there is provided a computer-readable storage medium storing computer-executable instructions which cause, when executed by a processor, the processor to perform a discount service method comprising: obtaining discount rate information depending on a change in a variable value for each of discount factors for an object to be sold; identifying, for a plurality of sales records for the object to be sold, a consumer distribution corresponding to a change in a discount rate for each discount factor for the object to be sold according to the discount rate information; and determining a final discount rate for a predetermined consumer of the object to be sold by applying a weight for each discount factor calculated based on the identified consumer distribution, wherein when the consumer distribution is changed, the weight for each discount factor is changed, and the final discount rate is determined differently even when the variable value for each discount factor of the predetermined consumer is kept the same.

According to one exemplary embodiment of the present disclosure, a discount rate is determined in consideration of the change in the plurality of discount factors due to a change in a commerce environment based on a result of analyzing the sales record. As a result, while maximizing the marketing effect of the discount, the seller can bear the discount cost to the minimum, and thus, it is possible to maximize the seller's service satisfaction.

In addition, by determining the discount rate in consideration of changes in the distance from the location of the consumer to the show place, the remaining time until the showtime, the popularity of content, and consumer preferences, the optimal discount rate can be determined in accordance with various changes in the transaction environment, so that the service satisfaction of consumers is also maximized.

DETAILED DESCRIPTION

Figure 1:
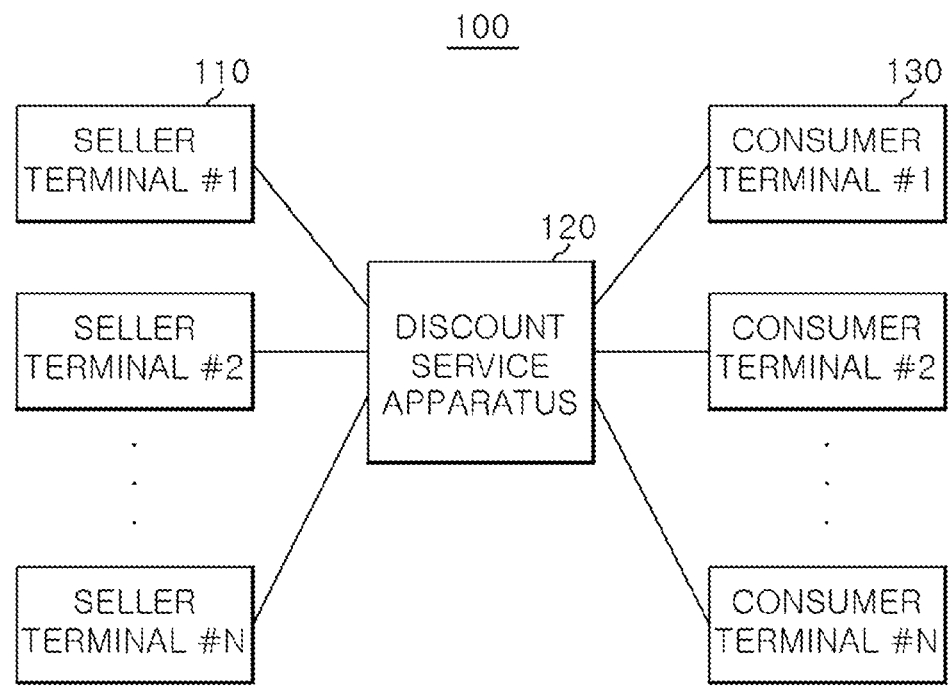
FIG. 1 is a block diagram of a discount service system including a discount service device according to one exemplary embodiment of the present disclosure.

The advantages and features of the exemplary embodiments and the methods of accomplishing the embodiments would be clearly understood from the following description taken in conjunction with the accompanying drawings. However, embodiments of the invention are not limited to those descriptions, as the exemplary embodiments may be implemented in various forms. It should be noted that the present embodiments are provided to make a full disclosure and also to allow a person of ordinary skill in the art to know the full range of the embodiments. Therefore, the embodiments are to be defined by the scope of the appended claims.

Terms of exemplary embodiments used in the present specification is briefly described below, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the exemplary embodiments of the invention. Therefore, the terms used in the present disclosure should be defined based on the meaning of the terms and the overall contents of the present disclosure, not just the name of the terms.

When it is described in the specification that a part "comprises or includes" a certain component, this means that the part may further include other components without excluding them unless specifically stated to the contrary.

In addition, a term such as a "unit" or a "part or portion" used in the specification means a software component or a hardware component such as FPGA or ASIC, and the "unit" or the "part or portion" performs a certain role. However, the "unit" or the "part or portion" is not limited to software or hardware. The "part or portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the exemplary embodiment of the present disclosure is described in detail with reference to the accompanying drawings so that those of ordinary skill in the art may easily implement the present disclosure. In the drawings, portions not related to the description are omitted in order to clearly describe the present disclosure.

FIG. 1 is a block diagram of a discount service system including a discount service device according to one exemplary embodiment of the present disclosure.

As illustrated in FIG. 1, in a discount service system 100, a plurality of seller terminals 110, a discount service device 120, and a plurality of consumer terminals 130 may be connected to each other through a communication network. Here, the communication network may be a wireless network or a wired network. For example, the seller terminal 110 and the discount service device 120 may be connected through a wired network, and the discount service device 120 and the consumer terminal 130 may be connected through a wireless network.

The seller terminal 110 provides information on an object to be sold and sale conditions to the discount service device 120. For example, the information on the object to be sold may include location information of a show place, showtime information, information on show target content, seating arrangement information, and the like. The information on the sale conditions may include information on an allowable discount rate allowed by the seller with respect to the object to be sold.

The discount service device 120 obtains the information on the object to be sold and the sale conditions from the seller terminal 110, and obtains consumer information from the consumer terminal 130. Then, the discount service device 120 determines a discount rate according to a change in the discount factor, and calculates a discounted selling price of the object to be sold based on the information on the object to be sold, the information on the sale conditions, the consumer information, the discount rate information according to the change in the discount factor, or the like. Here, when there are a plurality of discount factors, after determining a discount rate for each of the plurality of discount factors, the discounted selling price of the object to be sold may be calculated based on the determined discount rates. Subsequently, the discount service device 120 collects a sales record while providing a discount service for selling the object to be sold to the consumer terminal 130. In addition, the discount service device 120 obtains the discount rate information according to the variable value change for each discount factor for the object to be sold from the collected sales record, identifies a consumer distribution corresponding to the change in the discount rate for each discount factor for the object to be sold according to the obtained discount rate information, and calculates a weight for each discount factor based on the identified consumer distribution. Here, when there are a plurality of discount factors, discount rate information for each discount factor may be obtained as discount information with respect to the plurality of discount factors, the consumer distribution for each discount factor may be identified with respect to the plurality of discount factors, and thereafter, the weight for each of the plurality of discount factors may be calculated based on the identified consumer distribution. Subsequently, the discount service device 120 determines a final discount rate by applying the calculated weight for each discount factor. Here, when there are the plurality of discount factors, the discount service device 120 may determine the final discount rate by applying the weight to each of the plurality of discount factors. Then, the discount service device 120 recalculates the discounted selling price of the object to be sold by reflecting the determined final discount rate, and recollects the sales record while providing the discount service for selling the object to be sold to the consumer terminal 130 at the recalculated discounted selling price. Thereafter, the recollected sales record may be used to recalculate the discounted selling price of the object to be sold. In addition, the discount service device 120 may sell the object to be sold, that is, perform payment and sales processing related to commerce, and processing fee charging. Components, functions, and roles of the discount service device 120 is described again below with reference to FIGS. 2 and 3.

The consumer terminal 130 may receive the information on the object to be sold from the discount service device 120, output the received information through a user interface so that the consumer can recognize and check the information, and return information related to reservation or purchase for the object to be sold in accordance with the input through the user interface to the discount service device 120.

Heretofore, some functions of the seller terminal 110, the discount service device 120, and the consumer terminal 130 constituting the discount service system 100 have been described, but their functions and operations are not limited by the above descriptions. For example, while e-commerce for the object to be sold is made between the seller terminal 110 and the consumer terminal 130, the discount service device 120 may relay various information and perform various processing related to the e-commerce.

Figure 2:
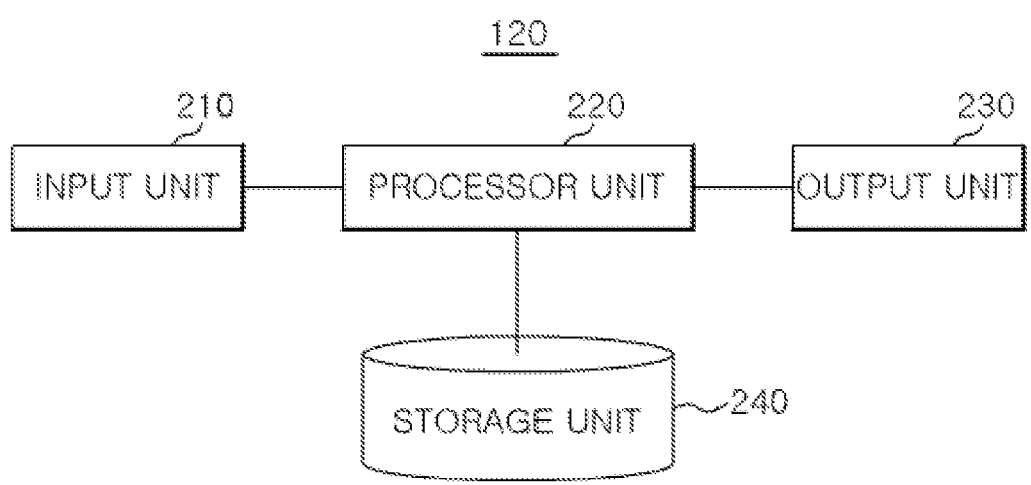
FIG. 2 is a detailed configuration diagram of the discount service device illustrated in FIG. 1.
Figure 3:
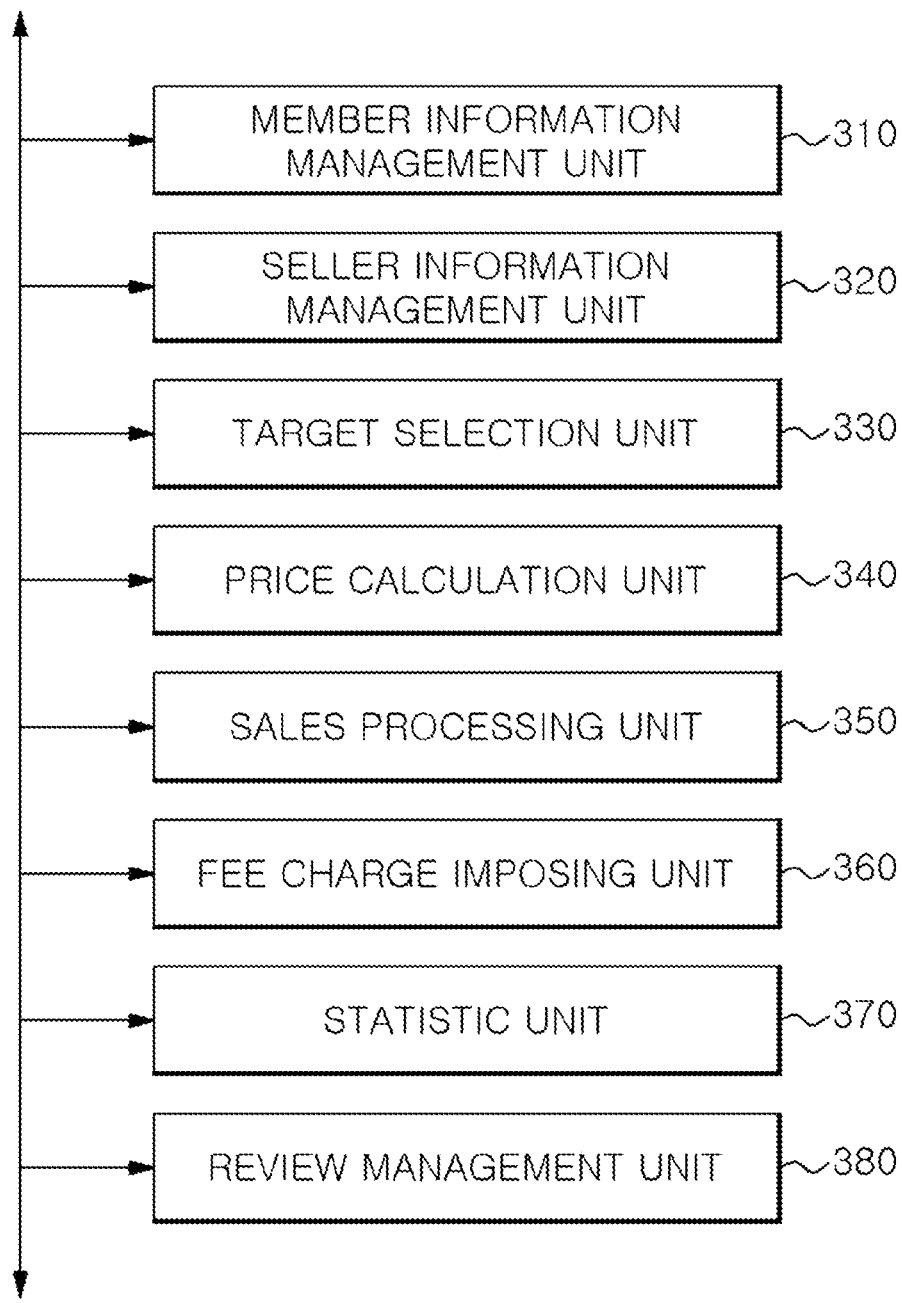
FIG. 3 is a detailed configuration diagram of a processor unit illustrated in FIG. 2.

FIG. 2 is a detailed configuration diagram of the discount service device 120 illustrated in FIG. 1, and FIG. 3 is a detailed configuration diagram of the processor unit 220 illustrated in FIG. 2.

As illustrated in FIG. 2, the discount service device 120 includes an input unit 210 and the processor unit 220, and may further include an output unit 230 and/or a storage unit 240.

The input unit 210 receives information on the object to be sold and the sale conditions and provides the information to the processor unit 220. Further, the input unit 210 receives consumer information including location information from the consumer terminal 130 and provides the consumer information to the processor unit 220. The input unit 210 may include a graphic input interface (GUI) capable of receiving data, a communication module capable of receiving data through a communication network, and the like. For example, through the communication module, the input unit 210, via the GUI, receives the information the object to be sold and the sale conditions from the seller terminal 110, and also receives the consumer information from the consumer terminal 130 and provides the consumer information to the processor unit 220. Alternatively, the input unit 210 may directly receive the information on the object to be sold, the information on the sale conditions, and the consumer information through the GUI and provide the information to the processor unit 220.

The processor unit 220 provides a discount service for selling the object to be sold at a discount based on the information on the object to be sold, the information on the sale conditions, the consumer information, and the like obtained through the input unit 210. For example, the processor unit 220 may include a computing unit such as a microprocessor for processing various calculations for providing the discount service. The processor unit 220 determines a discount rate according to a change in the discount factor, and calculates a discounted selling price of the object to be sold based on the information on the object to be sold, the information on the sale conditions, the consumer information, the discount rate information according to a change in the discount factor, and the like. Here, when there are a plurality of discount factors, the processor unit 220 may determine a discount rate for each of the plurality of discount factors. Subsequently, the processor unit 220 collects sales records while providing a discount service for selling the object to be sold to the consumer terminal 130. In addition, the processor unit 220 obtains discount rate information according to a change in a variable value for each discount element for the object to be sold from the collected sales records, and identifies the consumer distribution corresponding to the change in the discount rate for each discount factor with respect to the object to be sold according to the discount rate information for the plurality of sales records of the object to be sold. Here, when there are a plurality of discount factors, the processor unit 220 may obtain discount rate information for each of the plurality of discount factors from the collected sales records, and identify the consumer distribution for each of the plurality of discount factors. Thereafter, the processor unit 220 calculates the weight for each of the plurality of discount factors based on the identified consumer distribution. The processor unit 220 may perform optimization simulations for the object to be sold by using pre-trained machine learning model or deep learning model to produce a cost function. The cost function includes a plurality of optimal weights, each of which corresponds to each of the plurality of discount factors for the object to be sold. Subsequently, the processor unit 220 determines a final discount rate by applying the weight according to the discount factor, for example, the weight for each of the plurality of discount factors, recalculates the discounted selling price of the object to be sold by reflecting the determined final discount rate, and recollects the sales records while providing a discount service of selling the object to be sold to the consumer terminal 130 at the recalculated discounted selling price. Thereafter, the recollected sales records may be used to recalculate the discounted selling price of the object to be sold. In addition, the processor unit 220 may perform sales of the object to be sold, that is, payment and sales processing related to commerce, processing of service fee charging, and the like.

The processor unit 200 may determine a final discounted selling price or a recalculate a discounted selling price of the object to be sold by using pre-trained machine learning model or deep learning model. The pre-trained machine learning model or deep learning model is trained and re-trained continuously using the past sales records for the object being sold as training data. Specifically, the pre-trained machine learning model or deep learning model is trained based on the plurality of discount factors, discount rate according to a combination of variable values for each discount factor of the object being sold in the past and sales quantity when applying the discount rate or the combination of variable values for each discount factor of the object being sold to the object. The pre-trained machine learning model or deep learning model includes a first model which directly determines an optimal price. The pre-trained machine learning model or deep learning model includes a second model which calculates a reservation probability or a sales probability. The pre-trained machine learning model or deep learning model may include a price determining model which calculates an optimal price based on the calculated reservation probability or sales probability based on the plurality of discount factors, discount rate according to a combination of variable values for each discount factor of the object being sold in the past and sales quantity when applying the discount rate or the combination of variable values for each discount factor of the object being sold to the object. The pricing model may calculate an optimal price by using the law of supply and demand. The pricing model may include an artificial neural network. The pricing model may further include a model operating in Rule-based. The first model and second model may include CNN, DNN, RNN, Decision Tree and the like.

The processor unit 220 may include a member information management unit 310, a seller information management unit 320, a target selection unit 330, a price calculation unit 340, a sales processing unit 350, a service fee charge unit 360, a statistic unit 370, a review management unit 380, and the like. All of the units that require interaction with users (such as units 310, 320, 330, 380) may carry on their respective interactions with users via the GUI used by the input unit 210 described in paragraph 36. The member information management unit 310 may store and manage information of consumers who have joined as members among consumers using the consumer terminal 130 as member information in the storage unit 240. The seller information management unit 320 may store and manage information on the sale conditions input through the input unit 210 in the storage unit 240 as seller information. The target selection unit 330 may select a marketing target, e.g., which object to be sold is promoted to which consumer terminal 130 among the plurality of consumer terminals 130. The price calculation unit 340 may perform a function of calculating the discounted selling price of the object to be sold, which may be considered as a main function of the processor unit 220. The sales processing unit 350 may perform various processes related to the provision of the discount service for the object to be sold. The service fee charge unit 360 may charge a brokerage fee to the seller terminal 110 and the consumer terminal 130 according to the transaction result for the object to be sold. The statistic unit 370 may perform processing such as identifying the consumer distribution for each of the plurality of discount factors from the sales records collected with respect to the object to be sold. The review management unit 380 may store and manage service review data provided by the plurality of consumer terminals 130 in the storage unit 240. For example, the review management unit 380 may perform various processes for electronic bulletin board services such as consumer reviews. The function and role of the processor unit 220 is described again below with reference to FIGS. 4 to 7.

The output unit 230 outputs the calculation and processing results by the processor unit 220. The output unit 230 displays a plurality of a calculated optimal prices or a plurality of a recalculated optimal prices to a user. The user chooses an optimal price for the object to be sold from among the displayed a plurality of a calculated optimal prices or a plurality of a recalculated optimal prices. The user determines an optimal price for the object to be sold that is close to the displayed a plurality of a calculated optimal prices or a plurality of a recalculated optimal prices. The output unit 230 may include an output interface capable of outputting data such as the GUI used by the input unit 210 for direct displaying of the data on the GUI or a communication module capable of transmitting data through a communication network. For example, outputting the calculation and processing results by the output unit 230 may include various types of output such as outputting various calculations and processing results for providing the discount sales service for the object to be sold to the consumer terminal 130 through the output interface or to consumer terminal 130 through the communication module.

An operating system program for the discount service device 120 may be stored in the storage unit 240, and a result of processing by the processor unit 220 may be stored therein. For example, the storage unit 240 may be computer-readable recording medium such as a hardware device specially configured to store and execute program instructions, such as magnetic media such as hard disks, floppy disks, and magnetic tapes, optical media such as CD-ROMs and DVDs, magneto-optical medium such as floppy disks, a flash memory, or the like.

Figure 4:
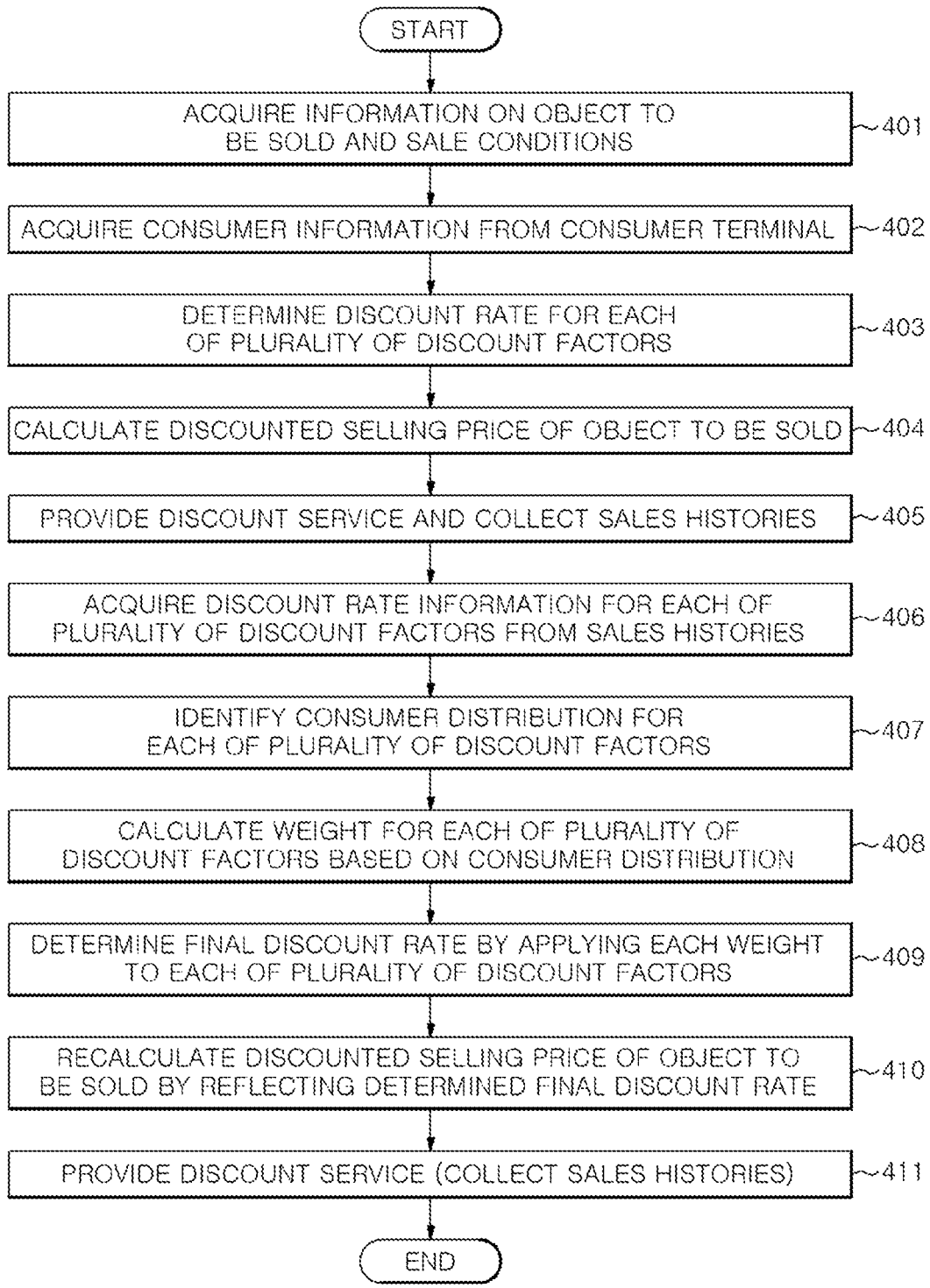
FIG. 4 is a flowchart describing a discount service method performed by the discount service device according to one exemplary embodiment of the present disclosure.
Figure 5:
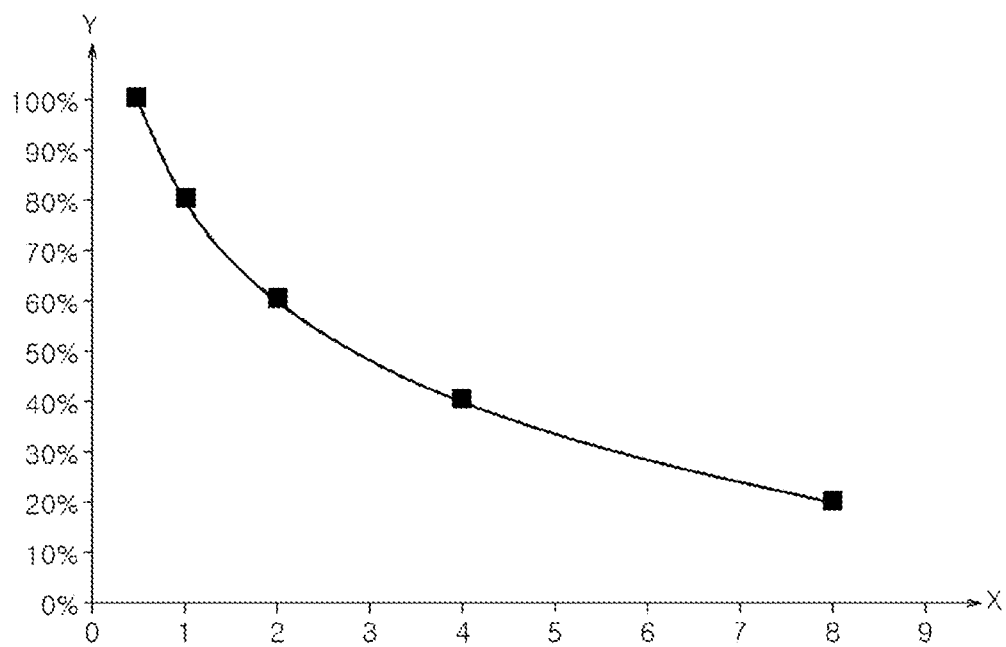
FIG. 5 is a graph illustrating a relationship between a remaining time until a showtime and a discount rate in the discount service method according to one exemplary embodiment of the present disclosure.
Figure 6:
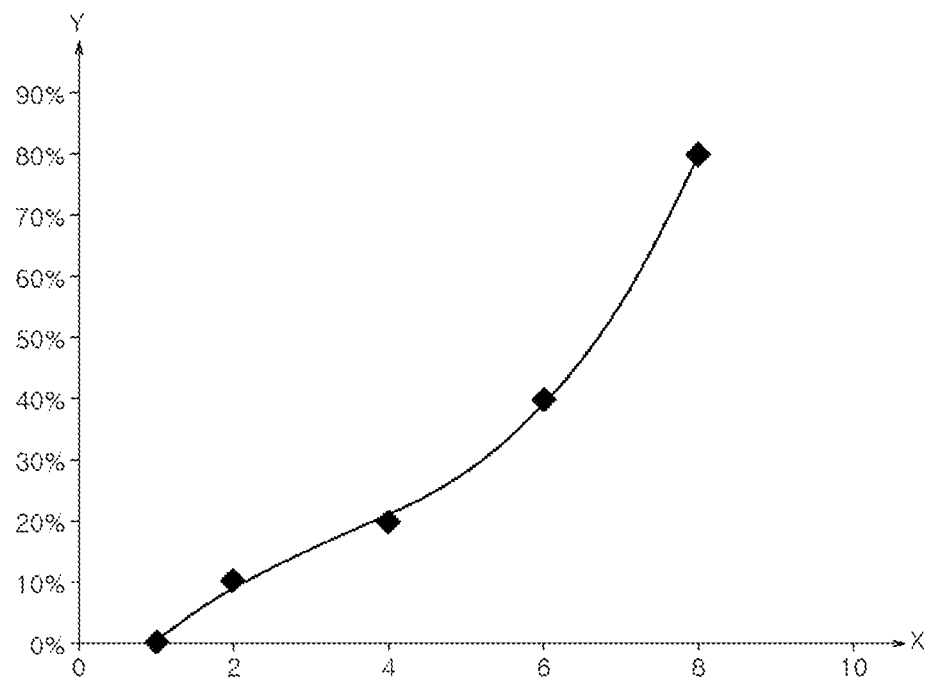
FIG. 6 is a graph illustrating a relationship between popularity and the discount rate in the discount service method according to one exemplary embodiment of the present disclosure.
Figure 7:
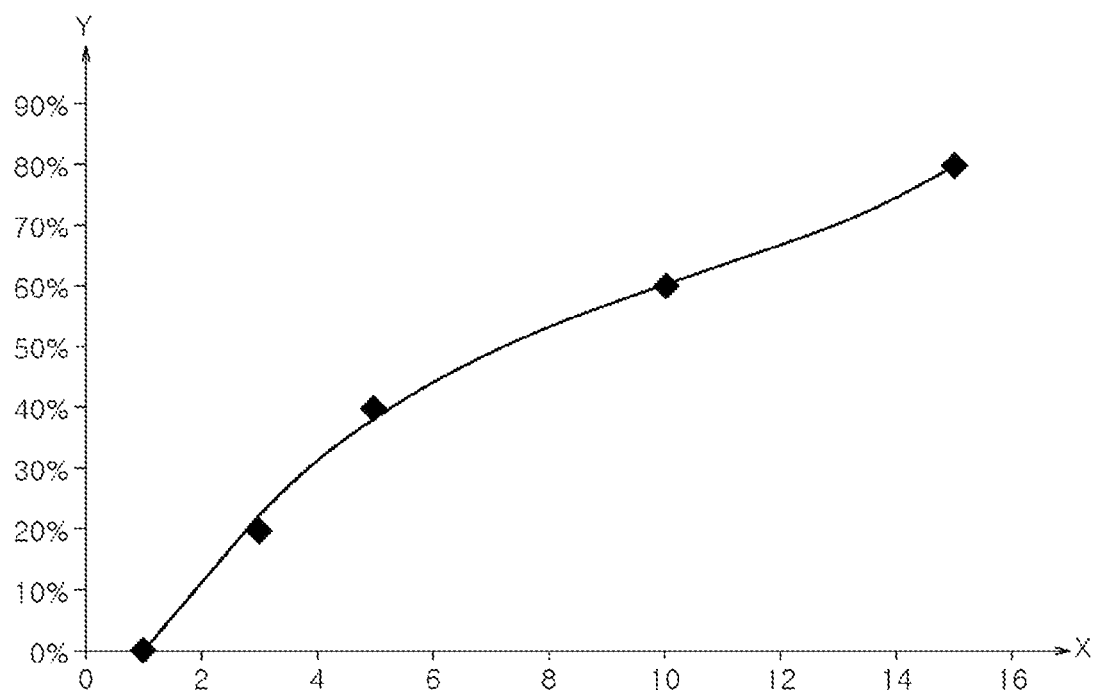
FIG. 7 is a graph illustrating a relationship between a distance from a location of a consumer to a show place and the discount rate in the discount service method according to one exemplary embodiment of the present disclosure.

FIG. 4 is a flowchart for explaining a discount service method performed by the discount service device 120 according to one exemplary embodiment of the present disclosure, FIG. 5 is a graph illustrating a relationship between a remaining time until a showtime and a discount rate in the discount service method according to one exemplary embodiment of the present disclosure, FIG. 6 is a graph illustrating a relationship between popularity and the discount rate in the discount service method according to one exemplary embodiment of the present disclosure, and FIG. 7 is a graph illustrating a relationship between a distance from a location of a consumer to a show place and the discount rate in the discount service method according to one exemplary embodiment of the present disclosure.

Hereinafter, a discount service method provided through the discount service system 100 including the discount service device 120 according to one exemplary embodiment of the present disclosure is described as follows with reference to FIGS. 1 to 7. In the following description, an exemplary embodiment in which a plurality of discount factors are used when determining the final discount rate of an object to be sold is described.

First, a user of the seller terminal 110, for example, an operator of a movie theater or a theater performance hall, may input the information on the object to be sold and the sale conditions through the seller terminal 110 or may directly input the information on the object to be sold and the sale conditions to the discount service device 120 via 120's GUI, and when the information is input into the seller terminal 110, the information on the object to be sold and the sale conditions is provided to the discount service device 120 by the seller terminal 110 (Step 401). Here, the information on the object to be sold may include location information of a show place, show time information, information on a show content, seating arrangement information, and the like. For example, when the object to be sold is a movie ticket, the information on the object to be sold may include location information of a movie theater, movie screening time information, information about a movie (for example, genre or the like), seating arrangement information, and the like. In addition, the information on the sale conditions may include information on an allowable discount rate that a seller can allow compared to a normal price of the ticket.

Then, the discount service device 120 obtains consumer information from the consumer terminal 130 (Step 402). For example, the consumer information may include location information of the consumer terminal 130, information on preference for objects to be sold, and the like. For example, when the object to be sold is a movie ticket, the preference information for the object to be sold may include information about a preferred movie genre.

In addition, the discount service device 120 determines a discount rate for each of the plurality of discount factors (Step 403), and calculates the discounted selling price of the object to be sold based on the information on the object to be sold, the information on the sale conditions, the consumer information, the discount rate information for each of the plurality of discount factors, and the like (Step 404). For example, the plurality of discount factors may include a discount factor depending on a change in location information of the consumer, a discount factor depending on a change in time information, a discount factor depending on a change in the popularity of the object to be sold, and the like. For example, the discount factor depending on the change in the location information of the consumer may be a change in the distance from the location of the consumer terminal 130 to the show place, and the discount factor depending on the change in the time information may be the change in the remaining time until the showtime. Here, the discount service device 120 may calculate the discounted selling price in such a way that the discount rate for each discount factor increases as the distance from the location of the consumer terminal 130 to the show place increases, the discount rate for each discount factor increases as the popularity of the object to be sold decreases, and the discount rate for each discount factor increases as the remaining time until the showtime decreases.

FIG. 5 is the graph illustrating the relationship between the remaining time until the showtime and the discount rate in the discount service method according to one exemplary embodiment of the present disclosure, FIG. 6 is the graph illustrating the relationship between the popularity and the discount rate in the discount service method according to one exemplary embodiment of the present disclosure, and FIG. 7 is the graph illustrating the relationship between the distance from the location of the consumer to the show place and the discount rate in the discount service method according to one exemplary embodiment of the present disclosure.

Referring to FIG. 5, as the remaining time until the showtime becomes shorter, it becomes less likely for the ticket to be sold at a regular price. Accordingly, as the remaining time corresponding to X-axis of FIG. 5 becomes shorter, the discount rate corresponding to Y-axis of FIG. 5 may be determined higher. The discount rate depending on the change in the remaining time (variable value) by the discount rate function illustrated in the graph of FIG. 5 may be represented as illustrated in Table 1.

TABLE 1

| | Remaining time | | | | | |
|---|---|---|---|---|---|---|
| | Within 0.5 hours | Within 1 hour | Within 2 hours | Within 4 hours | Within 8 hours | More than 8 hours |
| Discount rate | 100% | 80% | 60% | 40% | 20% | 0% |

Referring to FIG. 6, as the popularity of the object to be sold is lower, the likelihood that the object would be sold at a normal price is decreased. Accordingly, the lower the popularity ranking corresponding to X-axis of FIG. 6, the higher the discount rate corresponding to Y-axis of FIG. 6 may be determined. The discount rate depending on the change in the popularity ranking (variable value) by the discount rate function illustrated in the graph of FIG. 6 may be represented as Table 2 below. FIG. 6 and Table 2 exemplify a case in which the contents belonging to Group 1 have relatively higher popularity than other contents. That is, as it moves from an unranked group to Group 1, the higher the popularity is. The number of contents belonging to each group is not particularly limited. For example, the number of contents belonging to a specific (predetermined) group may change depending on a change in the number of contents having the same popularity.

TABLE 2

| | Popularity ranking | | | | | |
|---|---|---|---|---|---|---|
| | Group 1 | Group 2 | Group 3, 4 | Group 5, 6 | Group 7, 8 | Unranked group |
| Discount rate | 0% | 10% | 20% | 40% | 80% | 100% |

Referring to FIG. 7, as the distance from the consumer's location to the show place is increased, the likelihood that the object would be sold at a regular price is decreased. Accordingly, as the distance corresponding to X-axis of FIG. 7 increases, the discount rate corresponding to Y-axis of FIG. 7 may be determined higher. The discount rate depending on the change in the distance (variable value) by the discount rate function illustrated in the graph of FIG. 7 can be represented as Table 3 below.

TABLE 3

| | Distance | | | | | |
|---|---|---|---|---|---|---|
| | Within 1 km | Within 3 km | Within 5 km | Within 10 km | Within 15 km | More than 15 km |
| Discount rate | 0% | 20% | 40% | 60% | 80% | 100% |

When the discounted selling price of the object to be sold is calculated by applying the discount rate depending on the change in the variable value for each of the plurality of discount factors calculated in the above-described manner, the discount service device 120 provides the discount service that sells the object to be sold at a discount to the consumer terminal 130, and collects a plurality of sales records for the object to be sold while the discount service is provided (Step 405). For example, the collection of the discount service and the sales record for the object to be sold may be performed for a preset period or until a preset signal is input from the seller terminal 110. Here, the discount service device 120 providing the discount service may include operations of the member information management unit 310, the seller information management unit 320, the target selection unit 330, the sales processing unit 350, the service fee charge unit 360, the statistic unit 370, the review management unit 380, and the like which are included in the processor unit 220. For example, the member information management unit 310 may store and manage the information of consumers who have joined as members among consumers using the consumer terminal 130 in the storage unit 240 as member information (e.g., address, gender, age, phone number, and the like). The seller information management unit 320 may store and manage the information on the sale conditions input through the input unit 210 via its GUI in the storage unit 240 as the seller information. The target selection unit 330 may select a marketing target, e.g., which object to be sold is promoted to which consumer terminal 130 among the plurality of consumer terminals 130. The sales processing unit 350 may perform various processes related to the provision of the discount service for the object to be sold. For example, the sales processing unit 350 may transmit and promote the sales information (show place location, contact information, content title, content, character, show time, discount rate, and the like) of the object to be sold to the consumer terminal 130 selected as a marketing target by the target selection unit 330, and may perform online reservation processing or online sales processing, such as an e-commerce transaction for a movie ticket or a theater ticket. In addition, the service fee charge unit 360 may impose the brokerage fee on the seller terminal 110 and the consumer terminal 130 according to the transaction result of the object to be sold. Moreover, the review management unit 380 may store and manage service review data provided by the plurality of consumer terminals 130 in the storage unit 240.

Next, the discount service device 120 obtains discount rate information depending on the variable value change for each of the plurality of discount factors from the collected sales record (Step 406), and identifies the consumer distribution corresponding to the obtained discount rate changes for each of the plurality of discount factors (Step 407).

Here, the discount rate information depending on the variable value change for each of the plurality of discount factors obtained from the collected sales record is as illustrated in Tables 4 to 6. In this case, as illustrated in the example of Table 7, the consumer distribution table corresponding to the discount rate change for each of the plurality of discount factors may be prepared. Here, since the remaining time in Table 4 is classified into 6 types, the popularity ranking in Table 5 is classified into 6 types, and the distance in Table 6 is also classified into 6 types. Therefore, Table 7 shows 216 different discount factors obtained from $6^3$, but only some of them are listed. In this case, it is assumed that the plurality of discount factors are independent of each other for convenience and understanding of explanation.

TABLE 4

| Remaining time(RT) | Discount rate(DR) | User distribution (Total 100%) |
|---|---|---|
| Within 0.5 hours | 100% | 5% |
| Within 1 hour | 80% | 25% |
| Within 2 hours | 60% | 35% |
| Within 4 hours | 40% | 20% |
| Within 8 hours | 20% | 10% |
| More than 8 hours | 0% | 5% |

TABLE 5

| Popularity ranking(PR) | Discount rate(DR) | User distribution (Total 100%) |
|---|---|---|
| Group 1 | 0% | 15% |
| Group 2 | 10% | 10% |
| Group 3, 4 | 20% | 20% |
| Group 5, 6 | 40% | 25% |
| Group 7, 8 | 80% | 15% |
| Unranked group | 100% | 15% |

TABLE 6

| Distance(d) | Discount rate(DR) | User distribution (Total 100%) |
|---|---|---|
| Within 1 km | 0% | 25% |
| Within 3 km | 10% | 25% |
| Within 5 km | 20% | 15% |
| Within 10 km | 40% | 20% |
| Within 15 m | 80% | 10% |
| More than 15 km | 100% | 5% |

TABLE 7

| Type | RT | DR 1 | PR | DR 2 | d | DR 3 | Distribution (%) |
|---|---|---|---|---|---|---|---|
| 1 | 0.5 | 1 | 1 | 0 | 1 | 0 | 0.19 |
| 2 | 1 | 0.8 | 1 | 0 | 1 | 0 | 0.94 |
| 3 | 2 | 0.6 | 1 | 0 | 1 | 0 | 1.31 |
| 4 | 4 | 0.4 | 1 | 0 | 1 | 0 | 0.75 |
| 5 | 8 | 0.2 | 1 | 0 | 1 | 0 | 0.38 |
| 6 | More than 8 | 0 | 1 | 0 | 1 | 0 | 0.19 |
| ... | ... | ... | ... | ... | ... | ... | ... |
| 31 | 0.5 | 1 | Unranked group | 1 | 1 | 0 | 0.19 |
| 32 | 1 | 0.8 | Unranked group | 1 | 1 | 0 | 0.94 |
| 33 | 2 | 0.6 | Unranked group | 1 | 1 | 0 | 1.31 |
| 34 | 4 | 0.4 | Unranked group | 1 | 1 | 0 | 0.75 |
| 35 | 8 | 0.2 | Unranked group | 1 | 1 | 0 | 0.38 |
| 36 | More than 8 | 0 | Unranked group | 1 | 1 | 0 | 0.19 |
| 37 | 0.5 | 1 | 1 | 0 | 3 | 0.2 | 0.19 |
| 38 | 1 | 0.8 | 1 | 0 | 3 | 0.2 | 0.94 |
| 39 | 2 | 0.6 | 1 | 0 | 3 | 0.2 | 1.31 |
| 40 | 4 | 0.4 | 1 | 0 | 3 | 0.2 | 0.75 |
| 41 | 8 | 0.2 | 1 | 0 | 3 | 0.2 | 0.38 |
| 42 | More than 8 | 0 | 1 | 0 | 3 | 0.2 | 0.19 |
| ... | ... | ... | ... | ... | ... | ... | ... |
| 211 | 0.5 | 1 | 1 | 0.15 | 1 | 0.05 | 0.04 |
| 212 | 1 | 0.8 | 1 | 0.15 | 1 | 0.05 | 0.19 |
| 213 | 2 | 0.6 | 1 | 0.15 | 1 | 0.05 | 0.26 |
| 214 | 4 | 0.4 | 1 | 0.15 | 1 | 0.05 | 0.15 |
| 215 | 8 | 0.2 | 1 | 0.15 | 1 | 0.05 | 0.08 |
| 216 | More than 8 | 0 | 1 | 0.15 | 1 | 0.05 | 0.04 |

RT: Remaining time, PR: Popularity ranking, DR: Discount rate, d: Distance

Next, the discount service device 120 calculates the weight for each of the plurality of discount factors based on the consumer distribution identified in Step 407 (Step 408). Here, the calculating of the weight for each of the plurality of discount factors may mean calculating an optimal weight for each discount factor so that the seller can minimize the discount cost while maximally guaranteeing the marketing effect by the discount. For example, the price calculation unit 340 of the processor unit 220 may calculate weights (weight 1 to weight 3) for each of the plurality of discount factors that minimize the result value by using a cost function such as Equation 1.

$$\text{Sum \{distribution} \times (\text{weight 1} \times \text{remaining time discount rate} + \text{weight 2} \times \text{popularity discount rate} + \text{weight 3} \times \text{distance discount rate})\} \quad \text{(Equation 1)}$$

As a result of performing optimization simulations on the data exemplified in Tables 4 to 7 using a known statistical package R, in case that weight 1 is 5%, weight 2 is 0%, and weight 3 is 95%, it has been confirmed that the function value of Equation 1 became the minimum value (35.2%), and the weights 1, 2 and 3 correspond to the optimal weights for minimizing the burden on the seller.

Next, the discount service device 120 determines the final discount rate by applying a weight to each of the plurality of discount factors (Step 409). Here, the final discount rate may be determined by considering both the discount rate allowed by the seller terminal 110, that is, the seller of the object to be sold, and the optimal weight for each of the plurality of discount factors calculated previously. For example, the final discount rate may be determined using Equation 2.

$$\text{Final discount rate} = \{\text{remaining time discount rate} \times \text{optimal weight 1} + \text{popularity ranking discount rate} \times \text{optimal weight 2} + \text{distance discount rate} \times \text{optimal weight 3}\} \times \text{allowed discount rate} \quad \text{(Equation 2)}$$

Here, when the final discount rate is determined, the discount rate before the allowed discount rate is applied is in a state in which the optimal weight for each discount factor is applied, and thus, the discount rate is referred to as a weighted discount rate, and as in the example of Table 8, the weighted discount rate may be determined.

TABLE 8

| Remaining time | | | Distance | | | Weighted discount rate |
|---|---|---|---|---|---|---|
| Value | Discount rate | Weight 1 | Value | Discount | Weight 3 | |
| 1 | 0.8 | 0.05 | 10 | 0.6 | 0.95 | 0.61 |

According to the example of Table 8, the weighted discount rate may be determined by applying the remaining time discount rate and the distance discount rate among the remaining time discount rate, the popularity ranking discount rate, and the distance discount rate. As such, the weighted discount rate may be determined by applying some discount factors among the plurality of discount factors. For example, a weighted discount rate may be determined by applying the remaining time discount rate among the plurality of discount factors, and the final discount rate may be determined by applying the allowed discount rate to the determined weighted discount rate. For example, when the remaining time discount rate is applied, different remaining time discount rates may be applied for weekdays and holidays, or different remaining time discount rates may be applied for a morning time zone, a daytime zone, an evening time zone, and a late night time zone. Next, the discount service device 120 reflects the final discount rate determined in Step 409 to recalculate the discounted selling price of the object to be sold (Step 410). For example, the discounted selling price may be calculated using Equation 3.

$$\text{Discounted selling price} = \text{normal price} \times (1 - \text{final discount rate}) \quad \text{(Equation 3)}$$

Then, the discount service device 120 provides a discount service for selling the object to be sold at a discount to the consumer terminal 130 at the discounted selling price of the object to be sold recalculated in Step 410 (Step 411). At this time, similar to Step 405, the sales records may be collected, and Steps 406 to 410 may be performed again later.

Meanwhile, in the discount service of Step 411, after the initial discount rate for each of the plurality of discount factors applied to the discount service of Step 405 is updated to the final discount rate calculated in Step 408, the discount service may be provided to the consumer terminal 130 as in Step 405. In addition, the discount service device 120 may determine the final discount rate by additionally reflecting a designated location in a show place corresponding to the ticket. For example, the final discount rate for the designated location in the central area may be determined to be lower than that in the edge area among designated locations within the performance place. In addition, the statistic unit 370 may additionally reflect the genre and consumer's preference of a show item corresponding to the ticket for each of the plurality of consumer terminals 130 based on the sales record collection result in Step 405 and/or Step 411 to determine the final discount rate.

Meanwhile, each step included in the discount service method according to the above-described embodiment may be implemented in a computer-readable recording medium for recording a computer program including instructions for performing the step.

In addition, each step included in the discount service method according to the above-described embodiment may be implemented in the form of a computer program stored in a computer-readable recording medium programmed to include instructions for performing the step.

As described above, according to one exemplary embodiment of the present disclosure, a discount rate is determined in consideration of the change in the plurality of discount factors due to a change in a commerce environment based on a result of analyzing the sales record. As a result, while maximizing the marketing effect of the discount, the seller can bear the discount cost to the minimum, and thus, it is possible to maximize the seller's service satisfaction.

In addition, by determining the discount rate in consideration of changes in the distance from the location of the consumer to the show place, the remaining time until the showtime, the popularity of content, and consumer preferences, the optimal discount rate can be determined in accordance with various changes in the transaction environment, so that the service satisfaction of consumers is also maximized.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it would be understood by those skilled in the art that various changes and modifications can be made without departing from original characteristics of the present disclosure. Therefore, the exemplary embodiments disclosed in the present disclosure are intended to explain, not to limit, the technical scope of the present disclosure, and the technical scope of the present disclosure is not limited by the exemplary embodiments. The protection scope of the present disclosure should be interpreted based on the following claims and it should be appreciated that all technical scopes included within a range equivalent thereto are included in the protection scope of the present disclosure.

The invention claimed is:

1. A discount service method to be performed by a discount service device, the method comprising:
   obtaining, by the discount service device, discount rate information depending on a change in a variable value for each of a plurality of discount factors for an object to be sold;
   collecting, by the discount service device, a plurality of sales records for the object to be sold;
   Identifying, by the discount service device, according to the obtained discount rate information, with respect to a plurality of sales records for the object to be sold, a consumer distribution corresponding to a change in a discount rate for each discount factor for the object to be sold;
   training and retraining, by the discount service device, a neural network using sales records as training data;
   calculating, by the discount service device, using the neural network, a plurality of optimal weights for each discount factor;
   determining, by the discount service device, a final discount rate for a consumer of the object to be sold by applying a plurality of optimal weights for each discount factor, wherein in response to a change of the consumer distribution, the plurality of optimal weights for each discount factor are changed so that the final discount rate is determined differently while the variable value for each discount factor of the consumer being kept same; and
   providing, by the discount service device, a determined price of the object based on the final discount rate.

2. The discount service method of claim 1, wherein the discount factor includes at least one of a discount factor depending on a change in location information of the consumer, a discount factor depending on a change in time information, and a discount factor depending on a change in popularity of the object to be sold.

3. The discount service method of claim 2, wherein the object to be sold is a ticket for a show, the location information is a distance from a current location of the consumer to a place where the show is played, and the time information is a remaining time until a time at which the show starts.

4. The discount service method of claim 3, wherein in the determining of the final discount rate, the discount rate for the discount factor depending on the change in location information increases as the distance increases, the discount rate for the discount factor depending on the change in popularity increases as the popularity decreases, and the discount rate for the discount factor depending on the change in time information increases as the remaining time decreases.

5. The discount service method of claim 3, wherein in the obtaining of the discount rate information depending on the change in the variable value for each discount factor, in response to confirming that the initial discount rate is applied to each discount factor, the initial discount rate is updated to the final discount rate after the determining of the final discount rate.

6. The discount service method of claim 3, wherein the determining of the final discount rate includes determining the final discount rate depending on a designated location in the show place corresponding to the ticket.

7. The discount service method of claim 3, wherein the determining of the final discount rate includes determining the final discount rate depending on a genre corresponding to the ticket and a consumer's preference.

8. A discount service method to be performed by a discount service device, the method comprising:
   obtaining, by the discount service device, discount rate information depending on a change in a variable value for each of a plurality of discount factors for an object to be sold;
   collecting, by the discount service device, a plurality of sales records for the object to be sold;
   identifying, by the discount service device, according to the obtained discount rate information, with respect to a plurality of sales records for the object to be sold, a consumer distribution corresponding to a change in a discount rate for each discount factor for the object to be sold;
   training and retraining, by the discount service device, a neural network using sales records as training data;
   calculating a sales probability of the object to be sold based on the discount rate information and sales records of the plurality of discount factors of the object to be sold using the pre-trained neural network,
   determining a final discount rate for a consumer of the object to be sold based on the sales probability of the object to be sold, wherein in response to a change of the consumer distribution, the sales probability of the object to be sold for each discount factor are changed so that the final discount rate is determined differently while the variable value for each discount factor of the consumer being kept same; and
   providing a determined price of the object based on the final discount rate.

9. The discount service method of claim 8, wherein the discount factor includes at least one of a discount factor depending on a change in location information of the consumer, a discount factor depending on a change in time information, and a discount factor depending on a change in popularity of the object to be sold.

10. The discount service method of claim 9, wherein the object to be sold is a ticket for a show, the location information is a distance from a current location of the consumer to a place where the show is played, and the time information is a remaining time until a time at which the show starts.

11. The discount service method of claim 10, wherein in the determining of the final discount rate, the discount rate for the discount factor depending on the change in location information increases as the distance increases, the discount rate for the discount factor depending on the change in popularity increases as the popularity decreases, and the discount rate for the discount factor depending on the change in time information increases as the remaining time decreases.

12. The discount service method of claim 10, wherein in the obtaining of the discount rate information depending on the change in the variable value for each discount factor, in response to confirming that the initial discount rate is applied to each discount factor, the initial discount rate is updated to the final discount rate after the determining of the final discount rate.

13. The discount service method of claim 10, wherein the determining of the final discount rate includes determining the final discount rate depending on a designated location in the show place corresponding to the ticket.

14. The discount service method of claim 10, wherein the determining of the final discount rate includes determining the final discount rate depending on a genre corresponding to the ticket and a consumer's preference.

15. A non-transitory computer-readable storage medium storing computer-executable instructions which cause, when executed by a processor, the processor to perform a discount service method comprising:
    obtaining discount rate information depending on a change in a variable value for each of a plurality of discount factors for an object to be sold;
    collecting a plurality of sales records for the object to be sold;
    identifying according to the obtained discount rate information, with respect to a plurality of sales records for the object to be sold, a consumer distribution corresponding to a change in a discount rate for each discount factor for the object to be sold;
    training and retraining a neural network using sales records as training data;
    calculating, using the neural network, a plurality of optimal weights for each discount factor;
    determining a final discount rate for a consumer of the object to be sold by applying a plurality of optimal weights for each discount factor, wherein in response to a change of the consumer distribution, the plurality of optimal weights for each discount factor are changed so that the final discount rate is determined differently while the variable value for each discount factor of the consumer being kept same; and
    providing a determined price of the object based on the final discount rate.

\* \* \* \* \*